(12) United States Patent
Wilson Thampi et al.

(10) Patent No.: US 12,003,500 B2
(45) Date of Patent: Jun. 4, 2024

(54) TOKEN PROCESSING SYSTEM AND METHOD

(71) Applicant: Visa International Service Association, San Francisco, CA (US)

(72) Inventors: Wilson Thampi, Foster City, CA (US); Tony Thomas Kollamparambil, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 374 days.

(21) Appl. No.: 17/541,770

(22) Filed: Dec. 3, 2021

(65) Prior Publication Data

US 2023/0179587 A1 Jun. 8, 2023

(51) Int. Cl.
*H04L 9/40* (2022.01)
(52) U.S. Cl.
CPC ........ *H04L 63/083* (2013.01); *H04L 63/0807* (2013.01); *H04L 63/10* (2013.01)
(58) Field of Classification Search
CPC ............. H04L 63/0807; H04L 63/0876; H04L 63/0884; H04L 63/10; H04L 2209/56; H04L 9/3213
See application file for complete search history.

(56) References Cited

U.S. PATENT DOCUMENTS

| | | | |
|---|---|---|---|
| 8,296,835 B2 * | 10/2012 | Calamera .............. | H04L 9/3234 726/9 |
| 9,972,005 B2 | 5/2018 | Wong et al. | |
| 9,996,835 B2 | 6/2018 | Dill et al. | |
| 10,607,212 B2 | 3/2020 | Sheets et al. | |
| 10,891,610 B2 * | 1/2021 | Powell .................. | G06Q 20/12 |
| 2012/0030047 A1 | 2/2012 | Fuentes et al. | |
| 2015/0127547 A1 * | 5/2015 | Powell ................. | G06Q 20/382 705/67 |

(Continued)

FOREIGN PATENT DOCUMENTS

EP 3712828 A1 9/2020

OTHER PUBLICATIONS

EP22198352.1, "Extended European Search Report", dated Apr. 19, 2023, 10 pages.

*Primary Examiner* — Eric W Shepperd
(74) *Attorney, Agent, or Firm* — Kilpatrick Townsend & Stockton LLP (57) ABSTRACT

A method is disclosed and includes receiving, by a record server computer from a first processing network computer, a token, a device identifier associated with a user device, a session identifier associated with a registration request, and metadata about the token, and then receiving a metadata request from a second processing network computer in response to the second processing network computer receiving an authorization request message comprising the token, and the device identifier and/or the session identifier. The metadata request comprises at least the device identifier and/or the session identifier. The method also includes retrieving, by the record server computer, metadata associated with the metadata request, and providing the metadata to the second processing network computer. The second processing network computer processes the authorization request message using the token and the metadata.

15 Claims, 7 Drawing Sheets

(56) References Cited

U.S. PATENT DOCUMENTS

| | | | |
|---|---|---|---|
| 2015/0254659 A1* | 9/2015 | Kulkarni | G06Q 20/325 |
| | | | 705/44 |
| 2015/0373768 A1* | 12/2015 | Cohen | H04L 65/1069 |
| | | | 370/259 |
| 2016/0005043 A1* | 1/2016 | Goldstone | G06Q 20/108 |
| | | | 705/44 |
| 2017/0169433 A1* | 6/2017 | De Magalhaes | H04L 63/123 |
| 2018/0101834 A1* | 4/2018 | Laracey | G06Q 20/3224 |
| 2018/0330368 A1* | 11/2018 | Slupesky | H04L 67/02 |
| 2019/0303887 A1* | 10/2019 | Wright | H04L 9/0861 |
| 2019/0333034 A1* | 10/2019 | Shader | G06Q 20/14 |
| 2019/0356489 A1 | 11/2019 | Palanisamy | |
| 2020/0034837 A1 | 1/2020 | Narayan et al. | |
| 2020/0228611 A1* | 7/2020 | McDonald | H04L 67/142 |
| 2020/0402041 A1 | 12/2020 | Douglas et al. | |
| 2021/0042734 A1 | 2/2021 | Malhotra et al. | |
| 2021/0090074 A1 | 3/2021 | Powell et al. | |
| 2021/0097166 A1* | 4/2021 | Arora | H04L 63/0861 |
| 2021/0133729 A1 | 5/2021 | Murao et al. | |
| 2022/0067712 A1* | 3/2022 | Sarin | G06Q 20/3678 |
| 2023/0076077 A1* | 3/2023 | Ong | H04W 24/02 |
| 2023/0153795 A1* | 5/2023 | Moore | G06Q 20/385 |
| | | | 705/65 |

\* cited by examiner

TOKEN PROCESSING SYSTEM AND METHOD

CROSS-REFERENCES TO RELATED APPLICATIONS

None.

BACKGROUND

Some interactions such as access transactions can involve the use of processing network computers. Some interactions can be processed by one type of processing network computer, while other types of interactions can be processed by other types of processing network computers. For example, an access token that can be used to grant access to a resource can be compatible with one type of processing network computer, but may not be compatible with other types of processing network computers. Such incompatibilities can lead to interactions that cannot be completed or can lead to processing errors. Further in some cases, additional processing steps may need to be performed to rectify any errors that may have resulted from the attempted use of a token with an incompatible processing network computer.

Embodiments of the invention address these and other problems individually and collectively.

BRIEF SUMMARY

Embodiments improve the interactions with access devices relative to conventional systems.

One embodiment includes a method comprising: receiving, by a record server computer from a first processing network computer, a token, a device identifier associated with a user device, a session identifier associated with a registration request, and metadata about the token; receiving, by the record server computer, a metadata request from a second processing network computer in response to the second processing network computer receiving an authorization request message comprising the token, and the device identifier and/or the session identifier, the metadata request comprising at least the device identifier and/or the session identifier; retrieving, by the record server computer, the metadata in response to the metadata request; and providing, by the record server computer, the metadata to the second processing network computer, wherein the second processing network computer processes the authorization request message using the token and the metadata.

Another embodiment includes a system comprising: a record server computer comprising a processor, and a non-transitory computer readable medium comprising code, executable by the processor for performing operations comprising: receiving, from a first processing network computer, a token, a device identifier associated with a user device, a session identifier associated with a registration request, and metadata about the token; receiving a metadata request from a second processing network computer in response to the second processing network computer receiving an authorization request message comprising the token, and the device identifier and/or the session identifier, the metadata request comprising at least the device identifier and/or the session identifier; retrieving the metadata in response to the metadata request; and providing the metadata to the second processing network computer, wherein the second processing network computer processes the authorization request message using the token and the metadata.

Another embodiment includes a method comprising: providing, by a user device, a registration request comprising a device identifier to a first processing network computer; receiving, by the user device and from the processing network computer, a token and a session identifier; providing, by the user device, the token and the session identifier and/or the device identifier to an access device, wherein the access device transmits an authorization request message to a second processing network computer, which transmits a metadata request comprising the session identifier and/or the device identifier to a record server computer, receives metadata in response to the metadata request, and processes the transaction using the metadata.

Another embodiment of the invention includes a user device comprising a processor, and a non-transitory computer readable medium, the non-transitory computer readable medium comprising code, executable by the processor to perform steps including: providing a registration request comprising a device identifier to a first processing network computer; receiving, from the processing network computer, a token and a session identifier; and providing, by the user device, the token and the session identifier and/or the device identifier to an access device, wherein the access device transmits an authorization request message to a second processing network computer, which transmits a metadata request comprising the session identifier and/or the device identifier to a record server computer, receives metadata in response to the metadata request, and processes the transaction using the metadata.

Further details regarding embodiments of the invention can be found in the Detailed Description and the Figures.

DETAILED DESCRIPTION

Prior to discussing embodiments of the invention, some terms can be described in further detail.

A "key" may include a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "public key" may include an encryption key that may be shared openly and publicly. The public key may be designed to be shared and may be configured such that any information encrypted with the public key may only be decrypted using a private key associated with the public key (i.e., a public/private key pair).

A "private key" may include any encryption key that may be protected and secure. A private key may be securely stored at an entity and may be used to decrypt any information that has been encrypted with an associated public key of a public/private key pair associated with the private key.

A "public/private key pair" may refer to a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. In some embodiments, the public key may be authorized by a body known as a Certification Authority (CA) which stores the public key in a database and distributes it to any other entity which requests it. The private key can typically be kept in a secure storage medium and will usually only be known to the entity. Public and private keys may be in any suitable format, including those based on Rivest-Shamir-Adleman (RSA) or elliptic curve cryptography (ECC).

An "access device" may be any suitable device that provides access to a resource. An access device may be in any suitable form. Some examples of access devices include vending machines, kiosks, POS or point of sale devices (e.g., POS terminals), cellular phones, PDAs (personal digital assistant), personal computers (PCs), tablet PCs, hand-held specialized readers, set-top boxes, electronic cash registers (ECRs), automated teller machines (ATMs), virtual cash registers (VCRs), and the like. An access device may use any suitable contact or contactless mode of operation to send or receive data from, or associated with, a user device. In some embodiments, an access device may include a reader, a processor, and a computer-readable medium. A reader may include any suitable contact or contactless mode of operation. For example, exemplary readers can include radio frequency (RF) antennas, optical scanners, bar code readers, or magnetic stripe readers to interact with a payment device and/or mobile communication device.

"Access data" may include any suitable data that can be used to access a resource or create data that can access a resource. In some embodiments, access data may be account information for a payment account. Account information may include a PAN (primary account number), payment token, expiration date, card verification values (e.g., CVV, CVV2), dynamic card verification values (dCVV, dCVV2), an identifier of an issuer with which an account is held, etc. In other embodiments, access data could include data that can be used to access a location or to access secure data. Such information may be ticket information for an event, data to access a building, transit ticket information, passwords, biometrics or other credentials to access secure data, etc.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer.

A "resource provider" may be an entity that can provide a resource such as goods, services, information, and/or access to a location (e.g., a parking space, a transit terminal, etc.). Examples of resource providers include merchants, governmental authorities, secure data providers, etc. A resource provider may operate one or more access devices.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

A "processor" may refer to any suitable data computation device or devices. A processor may comprise one or more microprocessors working together to accomplish a desired function. The processor may include a CPU (central processing unit) comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "user" may include an individual. In some embodiments, a user may be associated with one or more personal accounts and/or user devices.

A "user device" may be a device that is operated by a user. Examples of user devices may include a mobile communication device such as a mobile phone, a smart phone, a card, a personal digital assistant (PDA), a laptop computer, a desktop computer, a server computer, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G ($3^{rd}$ generation), 4G ($4^{th}$ generation) or similar networks), Wi-Fi, Wi-Max, or any other communication medium that may provide access to a network such as the Internet or a private network. A user device may also be a credit, debit, or prepaid card.

A "credential" may be any suitable information that serves as reliable evidence of worth, ownership, identity, or authority. A credential may be a string of numbers, letters, or any other suitable characters that may be present or contained in any object or document that can serve as confirmation.

A "value credential" may be information associated with worth. Examples of value credentials include payment credentials, coupon identifiers, information needed to obtain a promotional offer, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

A "token" may be a substitute value for a credential. A token may be a string of numbers, letters, or any other suitable characters. Examples of tokens include tokens such as payment tokens, data that can be used to access secure systems or locations, etc.

A "payment token" may include an identifier for a payment account that is a substitute for an account identifier, such as a primary account number (PAN) and/or an expiration date. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO (International Standards Organization) 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which sensitive data is replaced with substitute data. For example, a real credential (e.g., a primary account number (PAN)) may be tokenized by replacing the real account identifier with a substitute number that may be associated with the real credential. Further, tokenization can be applied to any other information to substitute the underlying information with a token. "Token exchange" or "de-tokenization" can be a process of restoring the data that was substituted during tokenization. For example, a token exchange may include replacing a payment token with its associated primary account number (PAN). Further, de-tokenization or token exchange may be applied to any other information to retrieve the substituted information from a token. In some embodiments, token exchange can be achieved via a transactional message, such as an ISO message, an application programming interface (API), or another type of web interface (e.g., web request).

A "token service computer" can include a system that that services tokens. In some embodiments, a token service computer can facilitate requesting, determining (e.g., generating) and/or issuing tokens, as well as maintaining an established mapping of tokens to primary account numbers (PANs) in a repository (e.g. token vault). In some embodiments, the token service computer may establish a token assurance level for a given token to indicate the confidence level of the token to PAN binding. The token service computer may include or be in communication with a token vault where the generated tokens are stored. The token service computer may support token processing of payment transactions submitted using tokens by de-tokenizing the token to obtain the actual PAN.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service computer that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

"Token expiry date" may refer to the expiration date/time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as an time duration as measured from the time of issuance.

A "token request message" may be an electronic message for requesting a token. A token request message may include information usable for identifying a payment account or digital wallet, and/or information for generating a payment token. For example, a token request message may include payment credentials, mobile communication device identification information (e.g. a phone number or MSISDN (Mobile Station International Subscriber Directory Number), a digital wallet identifier, information identifying a tokenization service provider, a merchant identifier, a cryptogram, and/or any other suitable information. Information included in a token request message can be encrypted (e.g., with an issuer-specific key). In some embodiments, the token request message may include a flag or other indicator specifying that the message is a token request message.

A "token response message" may be a message that responds to a token request. A token response message may include an indication that a token request was approved or denied. A token response message may also include a payment token, mobile communication device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key). In some embodiments, the token response message may include a flag or other indicator specifying that the message is a token response message.

An "authorization request message" may be a message that requests permission to conduct an interaction. For example, an authorization request message may include an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. In some embodiments, it may be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

An "application" may be computer code or other data stored on a computer readable medium (e.g. memory element or secure element) that may be executable by a processor to complete a task.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

A "digital wallet provider" may include an entity, such as an issuing bank or third party service provider, that issues a digital wallet to a user that enables the user to conduct financial transactions. A digital wallet provider may provide standalone user-facing software applications that store account numbers, or representations of the account numbers (e.g., payment tokens), on behalf of a cardholder (or other user) to facilitate payments at more than one unrelated merchant, perform person-to-person payments, or load financial value into the digital wallet. A digital wallet provider may enable a user to access its account via a personal computer, mobile communication device or access device.

Figure 1:
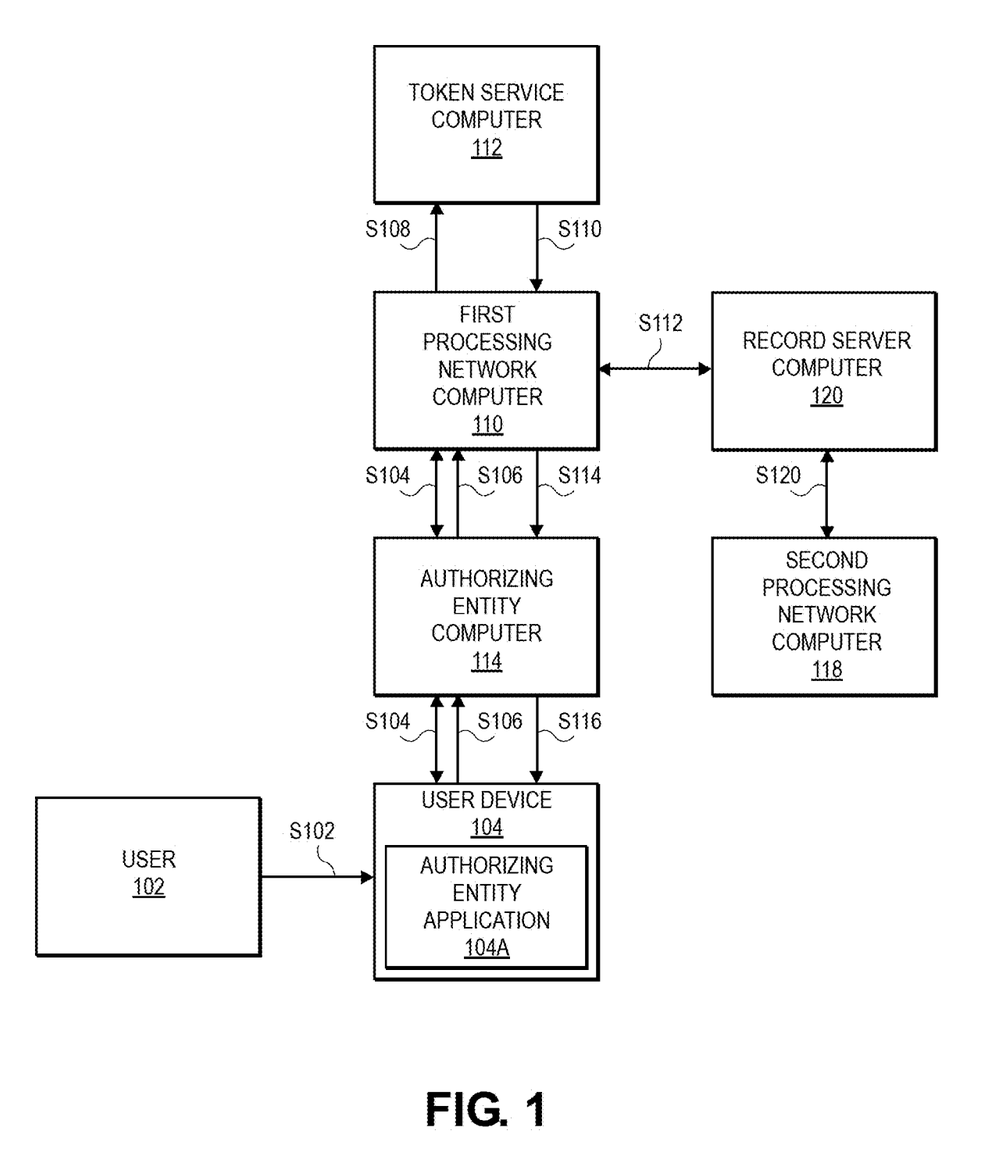
FIG. 1 shows a block diagram of a system along with a setup process flow according to an embodiment.

FIG. 1 shows a block diagram of a system along with a setup process flow according to an embodiment. The illustrated system includes a user 102 that uses a user device 104 comprising an authorizing entity application 104A. The authorizing entity application 104A can be affiliated with an authorizing entity computer 114. The authorizing entity computer 114 can communicate with the user device 104 via the authorizing entity application 104A. Other applications such as a wallet application associated with a wallet provider server computer can be used instead of the authorizing entity application 114.

The authorizing entity computer 114 can be in communication with a first processing network computer 110 and a token service computer 112. In some embodiments, the authorizing entity computer 114 may communicate with the first processing network computer 110 via an API or other trusted interface.

The first processing network computer 110 can be in communication with a record server computer 120. The record server computer 120 can be in communication with other processing network computers including the second processing network computer 118. The record server computer 120 can communicate with various processing network computers via APIs. Although two processing network computers 110, 118 are shown as being in communication with the record server computer 120, additional processing network computers, authorizing entity computers, resource provider computers, or other types of computers may be in communication with the record server computer 120.

Each of the entities in FIG. 1 may communicate through any suitable communication channel or communications network. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Embodiments of the invention can include methods and systems for conducting interactions using tokens that may be incompatible with certain processing network computers. A method can include receiving, by a first processing network computer, a registration request to enroll a user device. The registration request can comprise a device identifier, a public key associated with the user device (or the corresponding public key certificate), and any other suitable information about the user device. The device identifier can be an identifier such as a phone number, an IMEI (International Mobile Equipment Identity) number, a derived account identifier associated with an application, etc. In some embodiments, the device identifier can be a unique identifier associated with the application on a particular user device. For example, the authorizing entity application 104A can generate a device identifier that is specific to the authorizing entity application 104A on the user device 104. In some embodiments, if a user device has two application, then the user device can have two device identifiers, one for each application.

The method can also include determining, by the first processing network computer, a session identifier associated with the request to enroll. The session identifier can be a random number or a number derived from specific information about the registration event that is assigned to the request to enroll. In some embodiments, the session identifier can be associated with a particular credential (e.g., PAN) and device identifier combination, and a specific event. Then, responsive to receiving the request to enroll, the first processing network computer, provides the token to the user device. The record server computer can then receive from the first processing network computer and then store, the token, the device identifier associated with the user device, the session identifier associated with the registration request, and metadata about the token.

At a later time point, the user may attempt to conduct an interaction such as a transaction at a resource provider, which may send interaction requests to a second processing network computer that is different than the first processing network computer. Once an authorization request message is received by the second processing network computer, the record server computer can receive a metadata request from the second processing network computer. The authorization request message comprises a transaction amount, the token, and the device identifier and/or the session identifier, and other data including but not limited to a resource provider identifier (e.g., a merchant identifier), a cryptogram such as a CAVV (Cardholder Authentication Verification Value) or TAVV (Token Authentication Verification Value), etc. The metadata request comprises at least the device identifier and/or the session identifier. The record server computer then retrieves metadata associated with the metadata request, and provides the metadata to the second processing network computer. The second processing network computer then processes the authorization request message using the token and the metadata. The metadata may include, for example, information regarding any balances associated with the token, a status of the token (e.g., expired, active, etc.), or any restrictions or controls (e.g., token domain controls) associated with the token. Restrictions and controls associated with the token may be provided to the record server computer by the authorizing entity, the user, and/or any other appropriate entity.

Referring to FIG. 1, in step S102, the user 102 can open an authorizing entity application 104A on the user device 104. The authorizing entity application 104A can be a banking application operated by a bank holding an account of the user 102. Once the user 102 has opened the authorizing entity application 104A and authenticates herself to the application, the user 102 can interact with the authorizing entity application 104A to request the issuance of a token. In other embodiments, a token can be pushed to the user device 104 and the user can activate the token by contacting a Website operated by the authorizing entity.

In step S104, the user device 104 can transmit a registration request to the first processing network computer 110 via the authorizing entity computer 114 to register the user device 104. In some embodiments, the registration request may comprise registration information such as a device identifier for the user device 104 (e.g., a phone number, IMEI number, etc.), other information about the user device 104 (e.g., the manufacturer or model of the user device 104, etc.), and/or a public key associated with a private key that resides on the user device 104. In some embodiments, the device identifier can be generated by the authorizing entity application 104A, and then shared with the first processing network computer 110 so that both the authorizing entity application 104A and the first processing network computer 110 are in possession of the device identifier. In such cases, the device identifier may be unique to both the user device 104 and the authorizing entity application 104A.

After receiving, the registration request, the first processing network computer 110 can store the registration information in a local database. The first processing network computer 110 can then transmit a registration response message to the authorizing entity application 104A in the mobile communication device 104 via the first processing network computer 110. The registration response message may indicate that the user's user device 104 has been registered with the first processing network computer 110.

In step S106, after receiving the indication that the user device 104 is registered with the first processing network computer 110, the user device 104 can send an enrollment request message to the first processing network computer 110 via the authorizing entity computer 114. The enrollment request message may request the first processing network computer 110 to enroll a credential such as a primary account number of the user 102 and may also request the provisioning of a token to the user device 104.

In step S108, after receiving the enrollment request message, the first processing network 110 can transmit a token request message to the token service computer 112 to tokenize the credential provided by the user. The token service computer 112 can then determine a token that corresponds to the primary account number. In some embodiments, the token can be generated by the token service computer 112. In other embodiments, the token may be retrieved from a pre-existing pool of tokens that may be stored in a database.

In step S110, the token service computer 112 can provide the token back to the first processing network computer 110.

The first processing network 110 can also generate a session identifier associated with the current token request. This can be performed at any suitable point prior to step S112. The first processing network computer 112 can then bind the received token to the registration information associated with the user device 104.

In step S112, the first processing network computer 110 can provide (e.g., publish) the session identifier, the device identifier, a device integrity certificate (e.g., with the public key of the user 102), a business identifier, a token state for the token, a maximum authorization limit (or other restrictions or conditions) for the token to the record server computer 120. The token state of the token may be whether the token is active, unrestricted use, or limited use (e.g., can only be used under certain conditions). The maximum authorization limit may be the maximum transaction amount allowed for the token. The token state or the maximum authorization limit may be set by the authorizing entity operating the authorizing entity computer 114, the first processing network computer 110, and/or the user 102. In some embodiments, the record server computer 120 can store a data record with this information in the form of a ledger. The ledger can have the characteristics of a table, or could be in the form of a blockchain ledger.

In step S114, first processing network computer 110 transmits the token to the authorizing entity computer 114.

In step S116, the authorizing entity computer 114 transmits the token to the user device 104, which may store the token for later use.

In step S120, a second processing network computer 118 or other processing network computers may interact with the record server computer 120 in a manner similar to or different than the previously described steps. That is, other user devices and authorizing entity computers (not shown) may register with and request tokens from the second processing network computer 118 in a manner similar to that described above. The second processing network computer 118 may be different than and may operate in a different manner than the first processing network computer 110.

Figure 2:
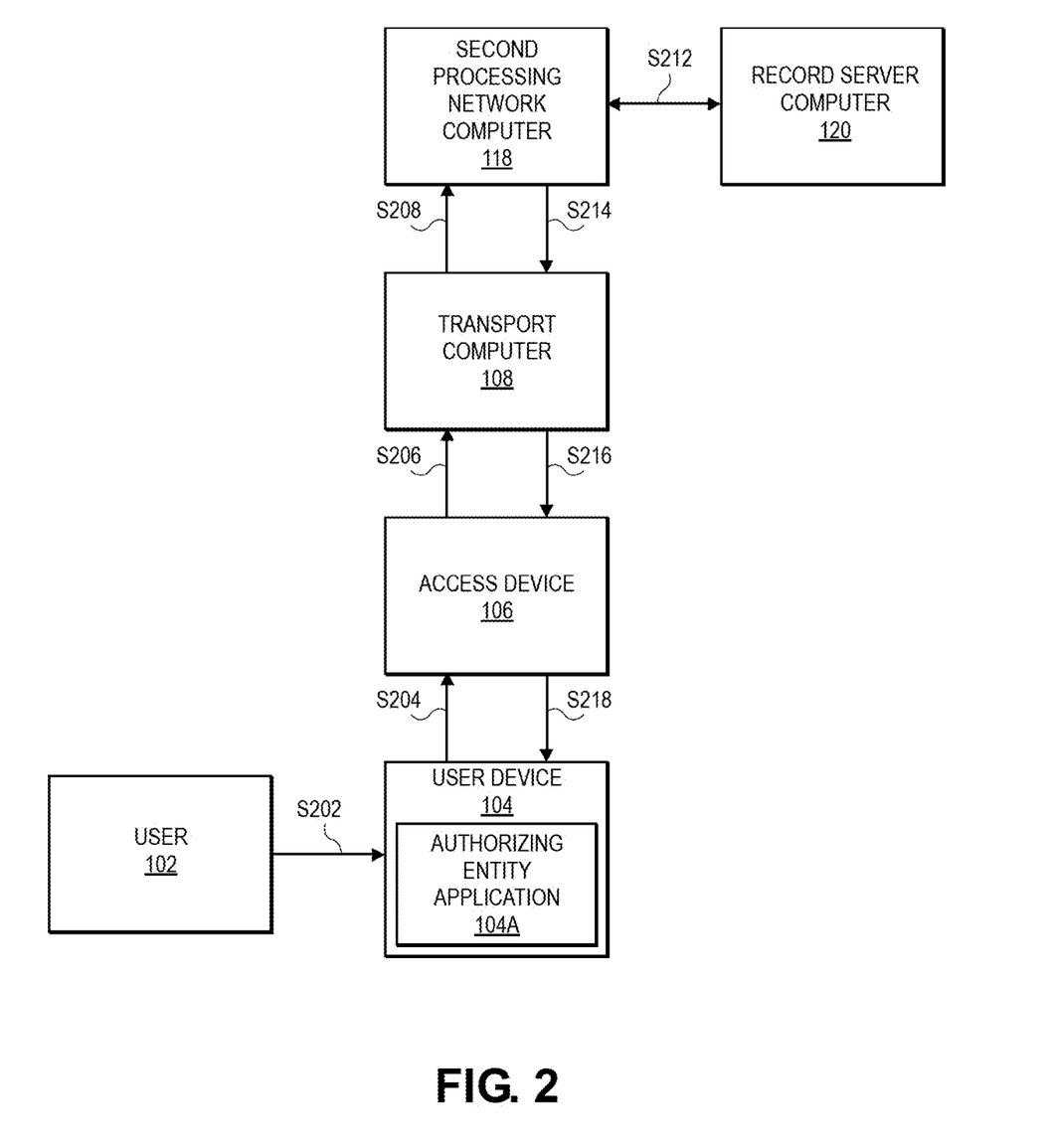
FIG. 2 shows another block diagram of a system along with an interaction process flow according to another embodiment.

FIG. 2 shows another block diagram of a system along with an interaction process flow according to another embodiment. FIG. 2 shows a user 102 that operates a user device 104. The user device 104 can communicate with an access device 106, which may be an interaction terminal such as a POS (point of service) terminal. The access device 106 may communicate with a second processing network computer 118 via a transport computer 108. The transport computer 108 may be an acquirer computer operated by an acquirer. The acquirer may manage an account associated with a resource provider (e.g., a merchant) operating the access device 106. The second processing network computer 118 can be in communication with the previously described record server computer 120. The second processing network computer 118 can be different than and can operate using different protocols or procedures than the first processing network computer 110 in FIG. 1.

In the interaction process flow in FIG. 2, the user 102 wishes to use the user device 104 to conduct an interaction such as a transaction at a resource provider (e.g., a merchant) operating an access device 106. However, the access device 106 or the resource provider operating the access device 106 may be configured to interact with or otherwise choose to interact with the second processing network computer 118 instead of the first processing network computer 110 in FIG. 1.

In step S202, the user 102 interacts with the user device 104 to prepare the user device 104 to conduct an interaction with the access device 106. For example, the user 102 can approach the access device 106 and can open the authorizing entity application. Once the authorizing entity application 104A on the user device 104 is open, the user 102 can authenticate themselves to it. Once the user 102 has authenticated themselves to the authorization entity application 104A on the user device 104, the user device 104 is ready to provide the previously provisioned token to the access device 106 to conduct the interaction. The user device 104 can also provide the device identifier and/or the session identifier to the access device 106. In some embodiments, the user device 104 may also provide cryptographically signed data (i.e., a digital signature) to the access device 106. For instance, the access device 106 may provide transaction data such as merchant identifier and a transaction amount to the user device 104. The user device 104 can then take its private key and may cryptographically sign the token, the merchant identifier and the transaction amount after concatenating this data.

In step S204, the user device 104 interacts with the access device 106 and passes the token to the access device 106. The access device 106 can request the token from the user device 104, or the user device 104 can push the token to the access device 106. The access device 106 may be programmed to route or have a preference to route any authorization request messages to the second processing network computer 118 instead of other processing network computers. In this particular example, the token may not be compatible with the second processing network computer 118.

In step S206, the access device 106 generates the authorization request message comprising a transaction amount, the token, and the device identifier and/or the session identifier, and then transmits it to the transport computer 108. The authorization request message may also optionally contain the previously described digital signature. The device identifier and/or the session identifier, and the digital signature may be present in supplemental data fields in the authorization request message if the authorization request message does not include pre-designated data fields for these values.

In step S208, after receiving the authorization request message, the transport computer 108 transmits the authorization request message to the second processing network computer 118. After receiving the authorization request message, the second processing network computer 118 can then analyze the token in the authorization request message. The second processing network computer 118 may then determine that the token is not one that it had previously generated or obtained. The second processing network computer 118 may determine this, based upon any suitable data, indication, or observation. For example, the token may be in a different format than tokens which are normally processed by the second processing network computer 118.

As a result of the determination that the token is not one that is normally processed by the second processing network computer 118, the second processing network computer 118, in step S212, can retrieve metadata associated with the token from the record server computer 120. The second processing network computer 118 can transmit a metadata request comprising the token to the record server computer 120. The metadata request can include the token, and at least the device identifier and/or the session identifier, and the digital signature. The record server computer 120 can retrieve the metadata from a database using the token, the device identifier and/or the session identifier. The metadata may include any suitable information such as the status of the token (e.g., active, inactive, etc.), as well as any restrictions that might be placed on the token (e.g., restrictions on the particular time or day of use, the types of merchants that can accept the token, and transaction amount limits on the use of the token, etc.), the digital certificate including the public key associated with the user device 104, etc.

In step S212, the second processing network computer 118 can then analyze the metadata to determine if the current transaction should or should not be authorized. For example, the second processing network computer 118 can determine integrity and authenticity of the token in the authorization request message by verifying the digital signature using the public key associated with the user device 104. The second processing network computer 118 can also determine integrity and authenticity of the token in the authorization request message by verifying that the device identifier and/or session identifier stored by the record server computer 120 matches the device identifier and/or session identifier in the authorization request message. Further, the second processing network computer 118 can verify that the transaction satisfies any limitations or restrictions on the use of the token. For example, the second processing network computer 118 can determine if restrictions on the particular time or day of use, the types of merchants that can accept the token, and/or transaction amount limits on the use of the token are satisfied. As an illustration, the metadata associated with the token may indicate that the token may not be used to conduct purchases over $1000. If the transaction amount in the authorization request message is over $1000, then the token is not being used properly and the transaction can be declined by the second processing network computer 118. In some embodiments, the processing network computer 118 can use the public key associated with the user device 104 to verify the digital signature that was received in the authorization request message.

In some embodiments, the device identifier may include a communication identifier such as a phone number, or the second processing network computer 118 can obtain the communication identifier from the record server computer 120. The second processing network computer 118 can perform a step up authentication process with respect to the user 102. In other embodiments, the second processing network computer 118 may communicate with the first processing network computer 110 (shown in FIG. 1) to request that it authenticate the user 102.

After the second processing network computer 118 determines that the authorization request message should (or should not) be authorized based on the analysis of the metadata and the information in the authorization request message, and also any optional step up authentication of the user, in step S214, the second processing network computer 118 can transmit an authorization response message back to the transport computer 108.

In step S216, the transport computer 108 can transmit the authorization response message to the access device 106.

In step S218, the access device 106 may inform the user device 104 that the transaction has been authorized.

In some embodiments, after the second processing network computer 118 approves of the transaction with the token, the second processing network computer 118 can send an update to the record server computer 120 to update the status of the token. For example, if the balance on the token was $100 and the current transaction was $75, then the token balance may be updated to $25.

Figure 3:
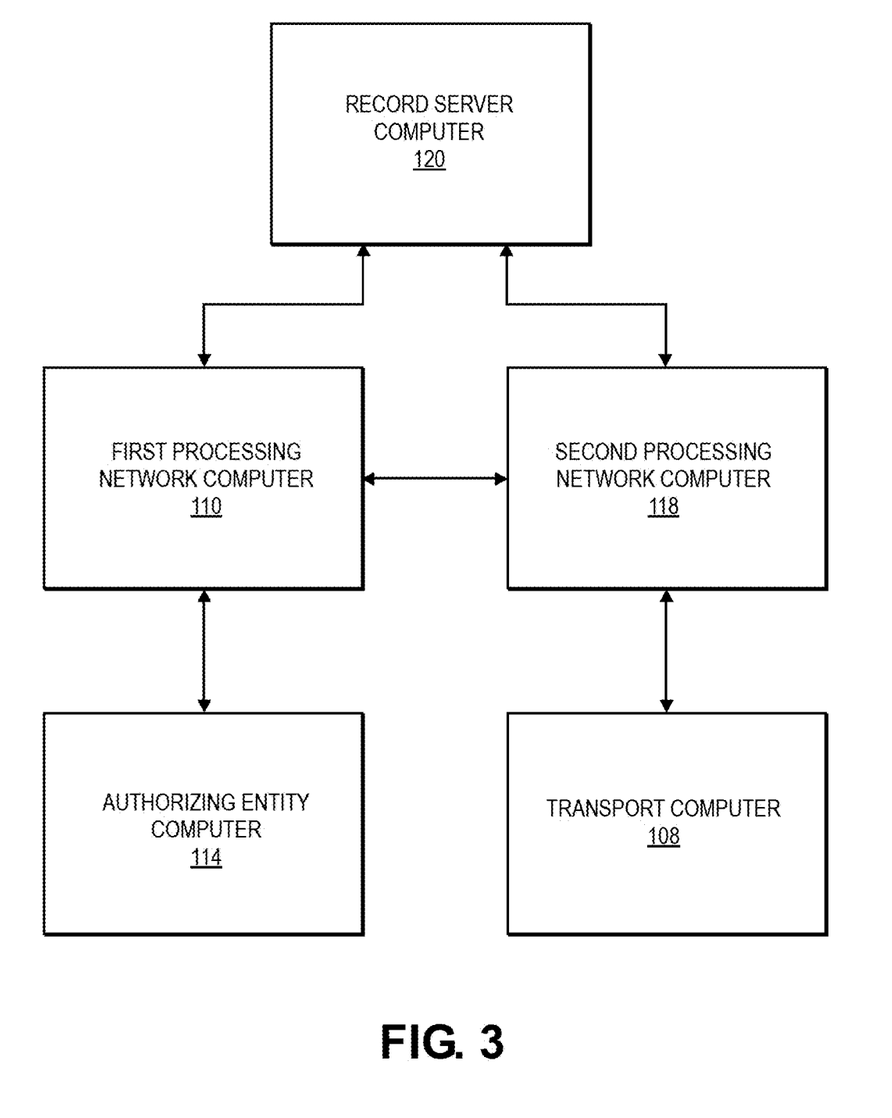
FIG. 3 shows another block diagram of a system along with a clearing and settlement process flow according to another embodiment.

FIG. 3 shows another block diagram of a system along with a clearing and settlement process flow according to another embodiment. In FIG. 3, the first processing network computer 110 is in communication with the authorizing entity computer 114, the record server computer 120, and the second processing network computer 118. The second processing network computer 118 can be in communication with the record server computer 120, the transport computer 108, and the first processing network computer 110.

The transaction described with respect to FIG. 2 can be cleared and settled. As the second processing network computer 118 has a record of the authorization of the transaction described with respect to FIG. 2, it may communicate with the first processing network computer 110 directly or via the record server computer 120 to provide a clearing request for the transaction and other transactions. The clearing requests may include information regarding the transaction amounts and the tokens used in the various transactions conducted by the second processing network computer 118. Once received, the first processing network computer 110 can resolve the tokens and determine the credentials (e.g., PANs) associated with the transactions, and may communicate with various authorizing entity computers associated with the credentials. For example, with respect to the transaction described with respect to FIG. 2, the first processing network computer 110 can then communicate with the authorization entity computer 114 to request that it transfer funds from the account of the user. Once the first processing network computer 110 receives the funds for the transaction it can transfer those funds along with other funds for other transactions to the transport computer 108 via the second processing network computer 118. As noted above, the transport computer 108 can hold an account with the resource provider, which the user conducted a transaction.

Figure 4:
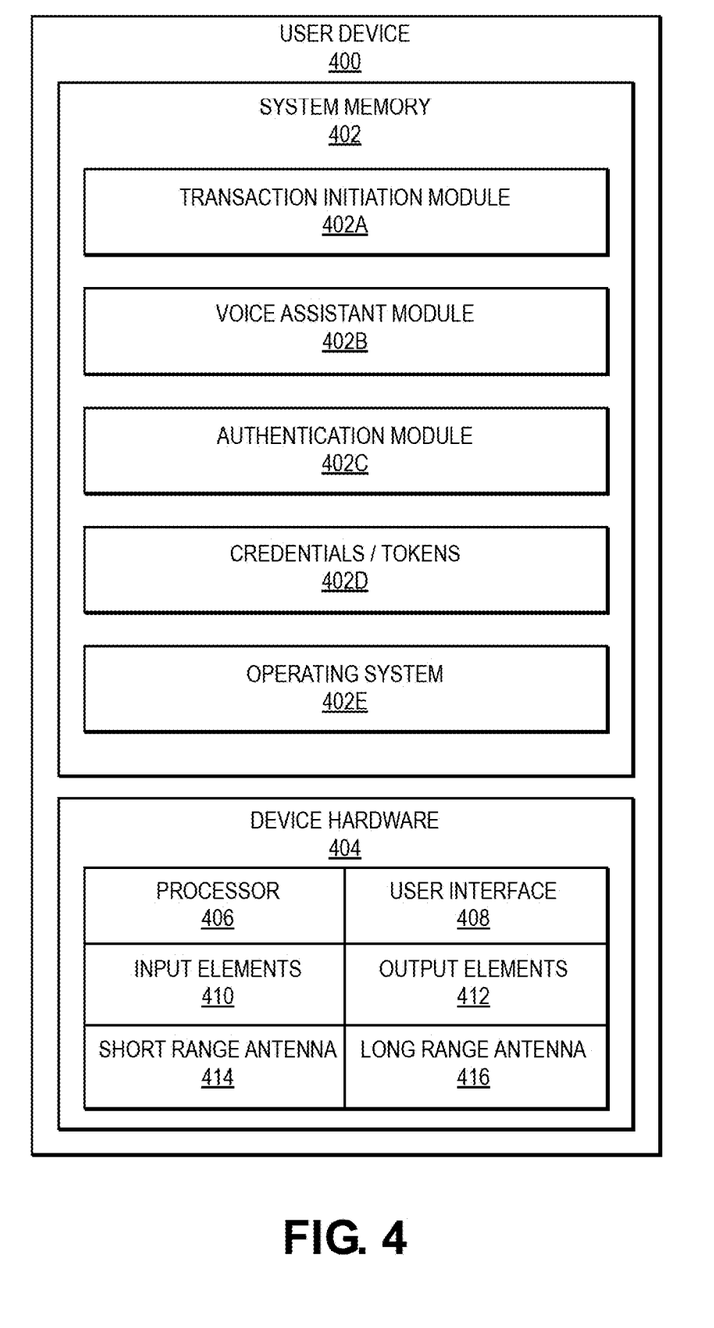
FIG. 4 shows a block diagram of a user device according to an embodiment.

FIG. 4 shows a block diagram of a user device according to an embodiment. User device 400 may include device hardware 404 coupled to a system memory 402.

Device hardware 404 may include a processor 406, a short range antenna 414, a long range antenna 416, input elements 410, a user interface 408, and output elements 412 (which may be part of the user interface 408). Examples of input elements may include microphones, keypads, touchscreens, sensors, etc. Examples of output elements may include speakers, display screens, and tactile devices. The processor 406 can be implemented as one or more integrated circuits (e.g., one or more single core or multicore microprocessors and/or microcontrollers), and is used to control the operation of user device 400. The processor 406 can execute a variety of programs in response to program code or computer-readable code stored in the system memory 402, and can maintain multiple concurrently executing programs or processes.

The long range antenna 416 may include one or more RF transceivers and/or connectors that can be used by user device 400 to communicate with other devices and/or to connect with external networks. The user interface 408 can include any combination of input and output elements to allow a user to interact with and invoke the functionalities of user device 400. The short range antenna 809 may be configured to communicate with external entities through a short range communication medium (e.g. using Bluetooth, Wi-Fi, infrared, NFC (Near Field Communication), etc.). The long range antenna 819 may be configured to communicate with a remote base station and a remote cellular or data network, over the air.

The system memory 402 can be implemented using any combination of any number of non-volatile memories (e.g., flash memory) and volatile memories (e.g. DRAM (Dynamic Random Access Memory), SRAM (Static Random Access Memory)), or any other non-transitory storage medium, or a combination thereof media. The system memory 402 may store computer code, executable by the processor 805, for performing any of the functions described herein. For example, it may include code, executable by the processor 406, for providing, by a user device, a registration request comprising a device identifier to a first processing network computer; receiving, by the user device and from the processing network computer, a token and a session identifier; providing, by the user device, the token and the session identifier and/or the device identifier to an access device, wherein the access device transmits an authorization request message to a second processing network computer, which transmits a metadata request comprising the session identifier and/or the device identifier to a record server computer, receives metadata, and processes the transaction using the metadata.

The system memory 402 may also store a transaction initiation module 402A, a voice assistant module 402B, an authentication module 402C, credentials 402D, and an operating system 402E. The transaction initiation module 402A may include instructions or code initiating and conducting a transaction with an external device such as an access device or a processing network computer.

System memory 402 may also store credentials and/or tokens 402D. Credentials may also include information identifying the user device 400 and/or the user of the user device 400.

Figure 5:
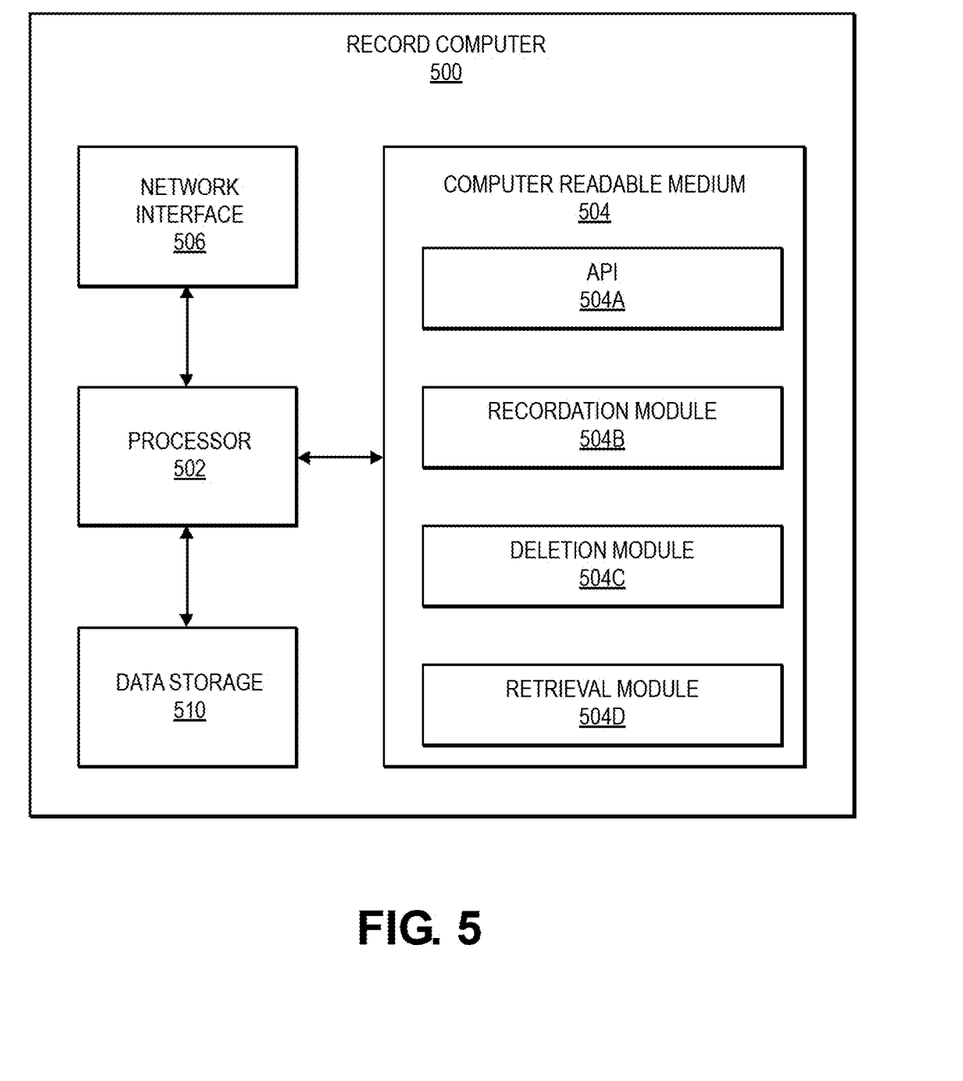
FIG. 5 shows a block diagram of a record computer according to an embodiment.

FIG. 5 shows a block diagram of a record computer 500 according to an embodiment. The record computer 500 may comprise a processor 502. It may also comprise a computer readable medium 504, a network interface 506, a data storage 510 operationally coupled to the processor 502.

The computer readable medium 504 may store code or instructions for allowing access device 500 to operate in the manner described herein. The instructions may be executed by the processor 502. For example, the computer readable medium 504 may comprise code or instructions for:

The computer readable medium 504 may further comprises an API module 504A, a recordation module 5046, a deletion module 504C, and a verification module 504D. The API module 504A may comprise software which will allow the record computer 500 to communicate with an external computer. The deletion module 504C may comprise code, executable by the processor 502, to delete records in the data storage, The retrieval module 504D may comprise code, executable by the processor 502, to retrieve date from the data storage 510.

The computer readable medium 504 may further comprise code, executable by the processor 502 to perform operations including: receiving, from a first processing network computer, a token, a device identifier associated with a user device, a session identifier associated with a registration request, and metadata about the token; receiving a metadata request from a second processing network computer in response to the second processing network computer receiving an authorization request message comprising the token, and the device identifier and/or the session identifier, the metadata request comprising at least the device identifier and/or the session identifier; retrieving metadata associated with the metadata request; and providing the metadata to the second processing network computer, wherein the second processing network computer processes the authorization request message using the token and the metadata.

Figure 6:
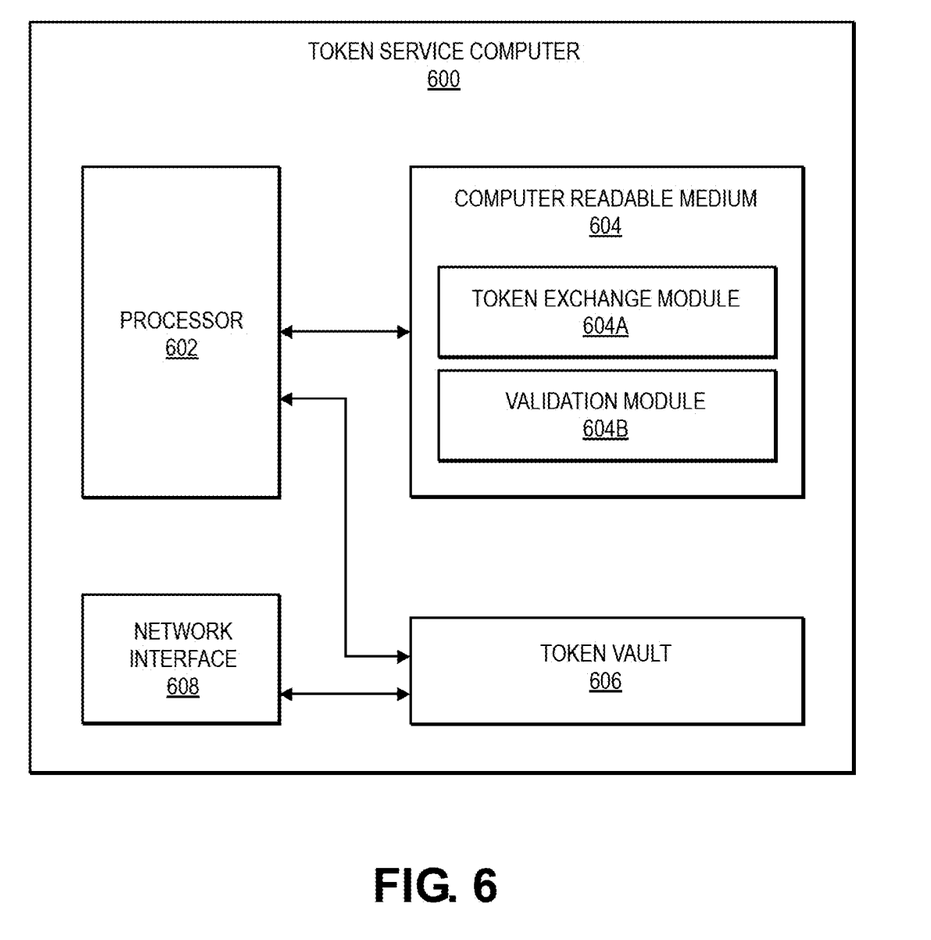
FIG. 6 shows a block diagram of a token service computer according to an embodiment.

FIG. 6 shows a block diagram of a token service computer according to an embodiment. FIG. 6 shows a token service computer 600. The token service computer 600 includes a processor 602 and a computer readable medium 604, a token vault 606, and a network interface 608 coupled to the processor 602.

The computer readable medium 604 may comprise a token exchange module 604A and a validation module 604B.

The token vault 606 may store tokens and their associated credentials in a database. The token vault 606 may store data in a database such as an Oracle™ database.

The tokenization exchange module 604A may comprise code that causes the processor 602 to provide tokens. For example, the token exchange module 604A may contain logic that causes the processor 602 to generate a payment token and/or associate the payment token with a set of payment credentials. A token record may then be stored in a token record database indicating that the payment token is associated with a certain user or a certain set of payment credentials.

The validation module 604B may comprise code that causes the processor 602 to validate token requests before a payment token is provided. For example, validation module 604B may contain logic that causes the processor 602 to confirm that a token request message is authentic by decrypting a cryptogram included in the message, by confirming that the payment credentials are authentic and associated with the requesting device, by assessing risk associated with the requesting device.

Figure 7:
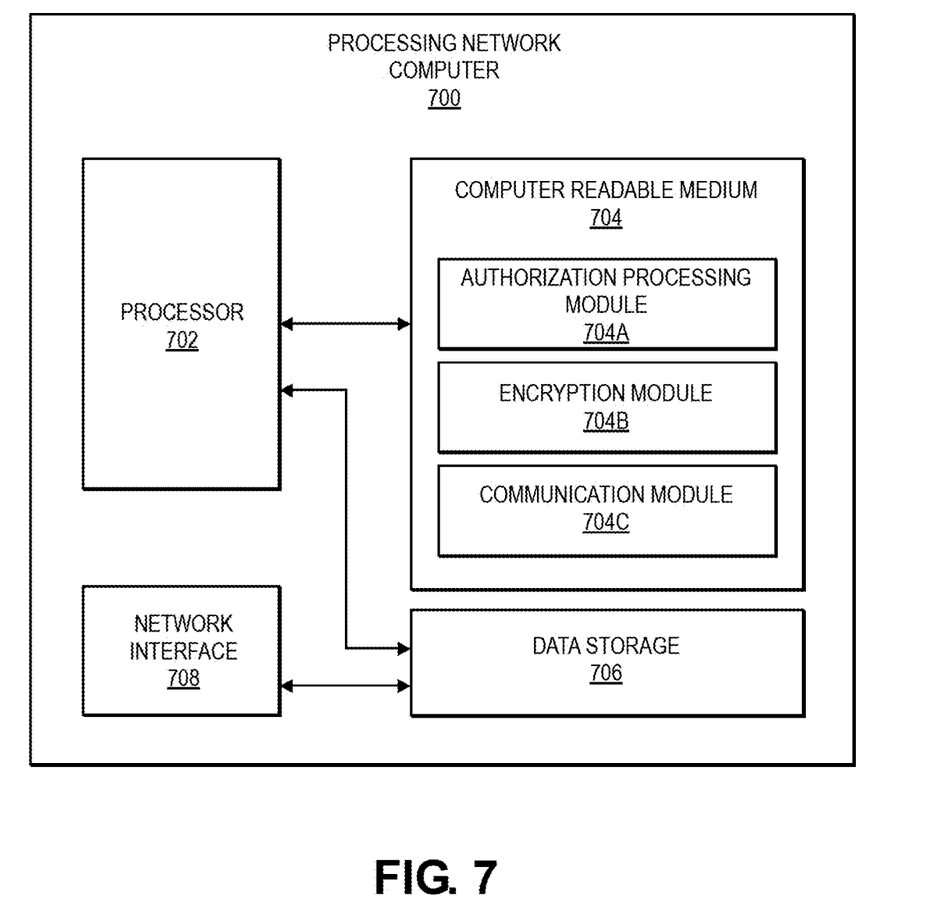
FIG. 7 shows a block diagram of a processing network computer according to an embodiment.

FIG. 7 shows a block diagram of a processing network computer 700 according to an embodiment. The processing network computer 700 may comprise a processor 702, which may be coupled to a computer readable medium 704, a data storage 706, and a network interface 708. The data storage 706 may contain access data such as tokens and/or account data, as well as mappings between access data, credentials, and/or communication device identifiers such as phone numbers, IP addresses, device identifiers, etc.

The computer readable medium 704 may comprise a number of software modules including an authorization processing module 704A, an encryption module 704B, and a communication module 704C. The computer readable medium may also comprise a clearing and settlement module (not shown).

The authorization processing module 704A may comprise code that can cause the processor 702 to evaluate authorization request messages for transactions and determine if the transactions should be authorized. The authorization processing module 704A may also include code for routing or modifying authorization request and response messages as they pass between various parties such as authorizing entity computers (e.g., issuer computers) and transport computers (e.g., acquirer computers).

The encryption/decryption module 704B may include any suitable encryption/decryption algorithms to encrypt data in embodiments of the invention. Suitable data encryption/decryption algorithms may include DES, triple DES, AES, etc. It may also store encryption keys that can be used with such encryption/decryption algorithms. The encryption module 704B may utilize symmetric or asymmetric encryption techniques to encrypt and/or verify data. Cryptographic keys that may be used by the encryption/decryption module 704B may be securely stored in the data storage 706.

The communication module 704C may comprise code that causes the processor 702 to generate messages, forward messages, reformat messages, and/or otherwise communicate with other entities.

Embodiments of the invention have a number of advantages. Embodiments of the invention allow users to conduct interactions with otherwise incompatible processing network computers that might be unable to process tokens that may be processed by other systems. Embodiments of the invention therefore provide for greater convenience and operational efficiency.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
receiving, by a record server computer from a first processing network computer, a token, a device identifier associated with a user device, a session identifier associated with a registration request, and metadata about the token;
receiving, by the record server computer, a metadata request from a second processing network computer after the second processing network computer receives an authorization request message comprising the token, and the device identifier and/or the session identifier, the metadata request comprising at least the device identifier and/or the session identifier;
responsive to the metadata request, retrieving, by the record server computer, the metadata; and
providing, by the record server computer, the metadata to the second processing network computer, wherein the second processing network computer processes the authorization request message using the token and the metadata,
wherein the method further comprises:
receiving, by the first processing network computer, the registration request from the user device, the registration request comprising the device identifier;
determining, by the first processing network computer, the session identifier associated with the registration request; and
after receiving the registration request, providing, by the first processing network computer, the token to the user device.

2. The method of claim 1, wherein the metadata comprises transaction controls associated with the token.

3. The method of claim 1, wherein the registration request comprises a public key, the user device storing a private key corresponding to the public key.

4. The method of claim 1, wherein the session identifier is a random number.

5. The method of claim 4, wherein the user device is a mobile phone.

6. The method of claim 1, wherein the authorization request message is received from an access device.

7. The method of claim 1, wherein the second processing network computer processes the authorization request message by using the metadata to validate the token and the user device that provided the token.

8. The method of claim 1, wherein the metadata request was generated in response to the second processing network computer receiving the authorization request message comprising the token, and the device identifier and/or the session identifier.

9. The method of claim 8, wherein an access device generated the authorization request message after the access device receives the token and the device identifier and/or the session identifier from the user device.

10. The method of claim 1, wherein the authorization request message comprises the token, and the device identifier and the session identifier.

11. The method of claim 1, wherein the record server computer comprises a plurality of data tables correlating a plurality of tokens and metadata for the tokens.

12. The method of claim 1, wherein the record server computer manages a blockchain with data correlating a plurality of tokens and metadata for the tokens.

13. The method of claim 1, wherein the record server computer communicates with the first processing network computer and the second processing network computer via APIs.

14. A system comprising:
a record server computer comprising a processor, and a non-transitory computer readable medium comprising code, executable by the processor for performing operations comprising:
receiving, from a first processing network computer, a token, a device identifier associated with a user device, a session identifier associated with a registration request, and metadata about the token;
receiving a metadata request from a second processing network computer after the second processing network computer receives an authorization request message comprising the token, and the device identifier and/or the session identifier, the metadata request comprising at least the device identifier and/or the session identifier;
retrieving the metadata in response to the metadata request; and
providing the metadata to the second processing network computer, wherein the second processing network computer processes the authorization request message using the token and the metadata,
wherein the operations further comprise:
receiving, by the first processing network computer, the registration request from the user device, the registration request comprising the device identifier;
determining, by the first processing network computer, the session identifier associated with the registration request; and
after receiving the registration request, providing, by the first processing network computer, the token to the user device.

15. The system of claim 14, further comprising:
the first processing network computer.

* * * * *